United States Patent [19]
Bauer et al.

[11] Patent Number: 5,602,766
[45] Date of Patent: Feb. 11, 1997

[54] METHOD OF AND DEVICE FOR FORMING THE SUM OF A CHAIN OF PRODUCTS

[75] Inventors: Harald Bauer, Nürnberg; Johannes Schuck, Röthenbach; Karl Hellwig, Nürnberg; Dietmar Lorenz, Erlangen, all of Germany

[73] Assignee: U.S. Philips Corporation, New York, N.Y.

[21] Appl. No.: 190,068

[22] PCT Filed: Jun. 4, 1993

[86] PCT No.: PCT/NL93/00117

§ 371 Date: Feb. 1, 1994

§ 102(e) Date: Feb. 1, 1994

[87] PCT Pub. No.: WO93/25959

PCT Pub. Date: Dec. 23, 1993

[30] Foreign Application Priority Data

Jun. 6, 1992 [DE] Germany .................. 42 18 769.9
Jun. 4, 1993 [WO] WIPO .................. PCT/NL93/00117

[51] Int. Cl.⁶ .................. G06F 7/38; G06F 7/52
[52] U.S. Cl. .................. 364/736; 364/754
[58] Field of Search .................. 364/736, 754, 364/757, 750.5; 395/550

[56] References Cited

U.S. PATENT DOCUMENTS

| | | | |
|---|---|---|---|
| 4,754,421 | 6/1988 | Bosshart | 364/754 |
| 4,755,965 | 7/1988 | Mary et al. | 364/DIG. 2 |
| 4,809,212 | 2/1989 | New et al. | 364/754 |
| 4,872,131 | 10/1989 | Kubota et al. | 364/736 |

FOREIGN PATENT DOCUMENTS 0173383  3/1986  European Pat. Off. .

OTHER PUBLICATIONS

NEC 7720 Product Description, pp. 1-1 -1-7; 2-1 -2-22; 3-1 -3-15, undated.

Bucklen et al, "Single-chip Digital Multipliers Form Basic DSP Building Blocks", EDN Electrical Design News, vol. 26, No. 7, Apr. 1, 1981 Newton, Mass., USA, pp. 153–163.

Titus, "MAC Chips", EDN Electrical Design News, vol. 32, No. 12, Jun. 11, 1987, Newton, Mass., USA, pp. 114–122, 124 and 126.

*Primary Examiner*—Tan V. Mai
*Attorney, Agent, or Firm*—Anne E. Barschall

[57] ABSTRACT

Digital signal processing often requires the fast summing of a chain of products. Known signal processors often use two separate dam buses via which the values to be multiplied are supplied in parallel, it being assumed that these values originate from different sources, for example from different memories. Because a product of two binary numbers has double the number of positions, therefore, an adder having double the word width is also used. In order to reduce this substantial expenditure at the expense of only a slight reduction in speed, an adder is provided having only the single word width and to process the most-significant and least-significant bits of the product during two successive clock periods. The values to be multiplied can then be supplied successively.

14 Claims, 2 Drawing Sheets

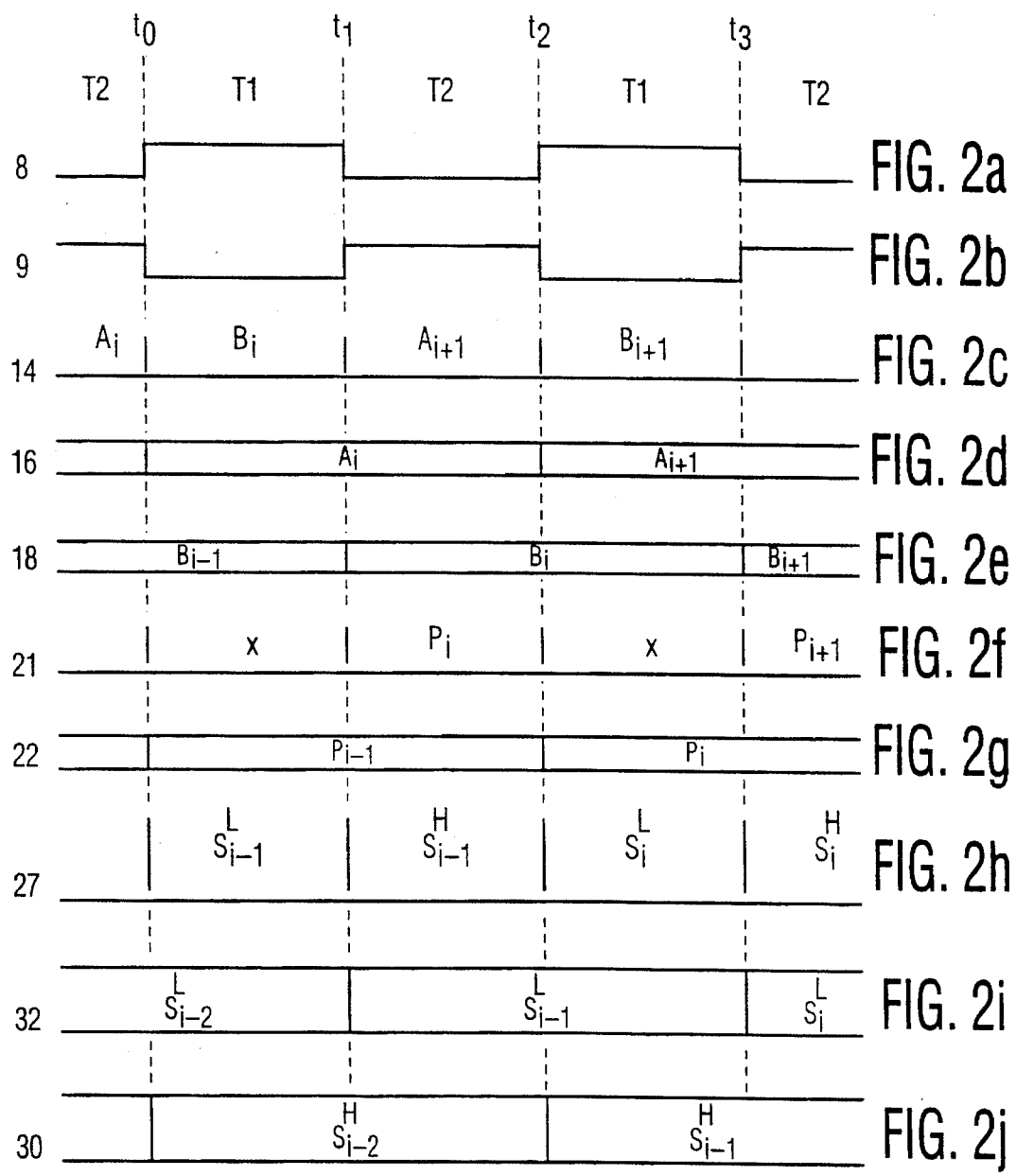

METHOD OF AND DEVICE FOR FORMING THE SUM OF A CHAIN OF PRODUCTS

SUMMARY OF THE INVENTION

The invention relates to a method of forming the sum of a chain of products of each time two numbers which are successively supplied, each intermediate result of the summing operation being temporarily stored, and also relates to a device for forming the sum of a chain of products of each time a first and a second value, comprising a storage device for storing a number of values with a predetermined first number of bits, a clock-controlled control device for controlling the writing of values in registers, a first register device for storing each time two values to be multiplied by one another, a multiplier device comprising two inputs which are connected to the first register device, and a downstream product register which comprises an output for double the first number of bits, an adder device which comprises two sum inputs for each time the first number of bits, one of said inputs being connectable to the output of the product register, and a downstream sum register which consists of at least two partial sum registers for each time the first number of bits comprising an output which can be coupled to the other input of the adder device.

Methods of this kind are frequently used in digital signal processing, for example for the filming of signal waveforms and devices of this kind are used in many multipurpose signal processors. In order to enable the processing of signal sequences with a high frequency, customary signal processors comprise two data buses so as to enable the formation of a new product during each clock period. Because, moreover, this product contains double the number of bits, i.e. has double the word width, the adder device is also designed for double the word width. However, this represents a comparatively high expenditure.

It is an object of the invention to provide a method of the kind set forth which enables the formation of the sum of a chain of products with little expenditure and at the expense of only a slightly reduced speed.

This object is achieved in accordance with the invention in that the product produced by each separate multiplication is added to the intermediate result in two steps in that during the first step only the least-significant positions of the product are added to the corresponding positions of the intermediate result, the first partial sum thus formed being temporarily stored, whereas during the second step the remaining, more-significant positions of the product are added to the corresponding remaining positions of the intermediate sum and the carry of the first partial sum, the second partial sum thus formed being temporarily stored, during each step there being supplied another one of the numbers to be directly subsequently multiplied.

It is a further object of the invention to provide a device of the kind set forth which enables the formation of the sum of a chain of products with less expenditure and at the expense of only a slightly reduced speed.

This object is achieved in accordance with the invention in that the storage device is connected to the first register device via only one data bus for the first number of bits, and that the control device is conceived to operate alternately in a first and a second clock period and to apply, during the first clock period the first number of least-significant bits at the output of the product register and the contents of the second partial sum register to the inputs of the adder device, and to write, at the end of this clock period, one of the first values into the register device and the new partial sum appearing at the output of the adder device into the second partial sum register, and to apply, during the second clock period, the first number of most-significant bits at the output of the product register and the contents of the first partial sum register as well as a temporarily stored carry, to the adder device and to write, at the end of this clock period, one of the second values into the register device and the second partial sum appearing at the output of the adder device, into the first partial sum register as well as to write the product formed by the multiplier device into the product register.

Each complete partial sum is thus formed during two clock periods, so that overall the processing speed is halved. However, this requires only a single data bus via which the values to be processed are successively transferred and, moreover, it suffices to use an adder device for only the single word width which successively determines the partial sums during the two clock periods. Because initially only the partial sum is formed from the least significant bits, the carry from the first partial sum is always available for the formation of the second partial sum. Consequently, no rounding errors occur, because all positions present are indeed evaluated, and the exact result can ultimately be extracted from the second partial sum register.

BRIEF DESCRIPTION OF THE DRAWINGS

An embodiment of the invention will be described in detail hereinafter with reference to the drawing. Therein:

FIG. 2 shows the succession in time of individual values occurring at different locations within the block diagram shown in FIG. 1.

DETAILED DESCRIPTION OF THE PREFERRED EMBODIMENT

Figure 1:
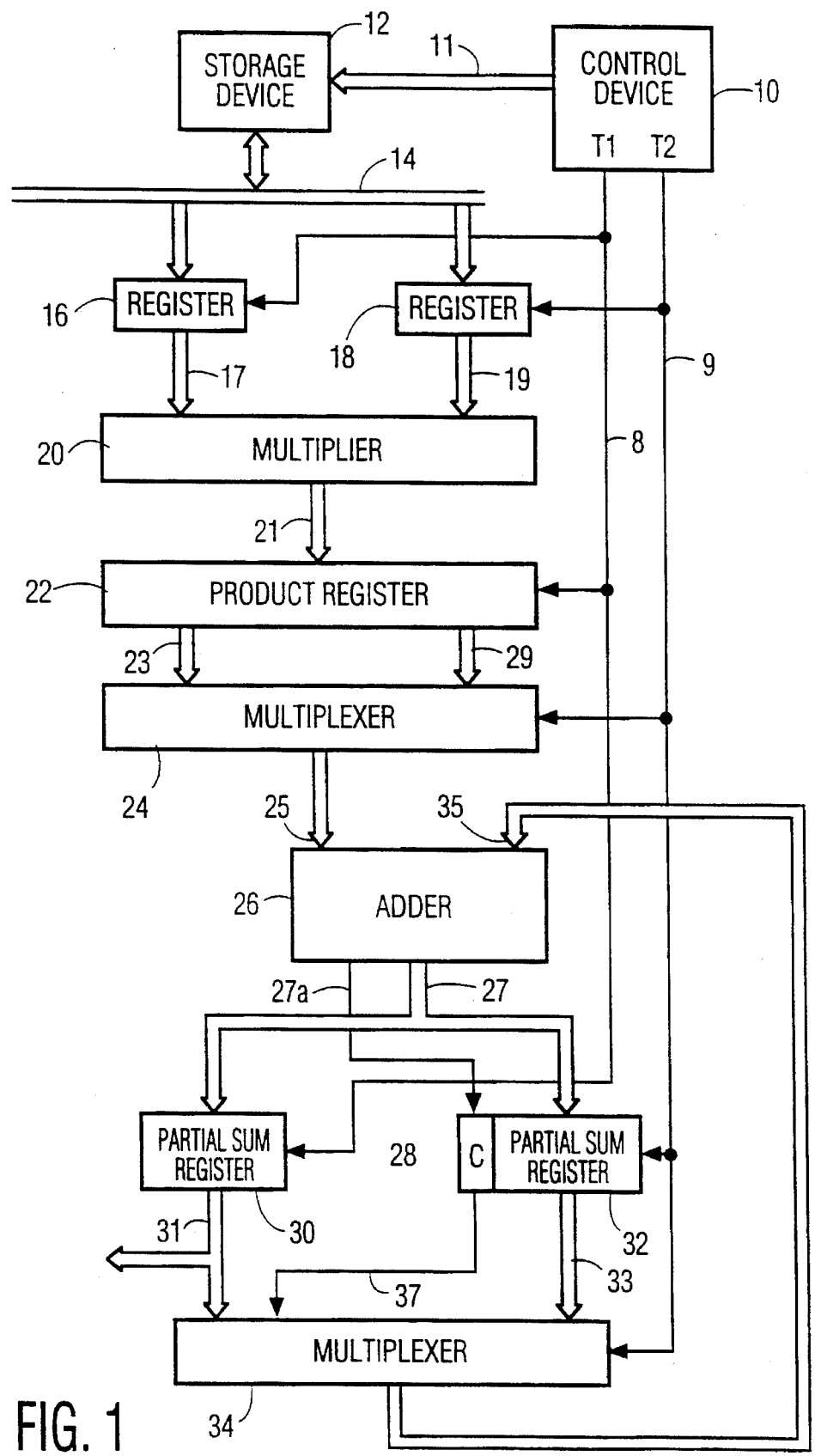
FIG. 1 shows a block diagram of significant parts of a device in accordance with the invention.

A control device 10 in FIG. 1 generates two control signals T1 and T2 on the leads 8 and 9, which signals cyclically alternate. On an output 11 the control device 10 also generates addresses for addressing a storage device 12. The connection 11 is shown to be double, because it actually consists of a number of parallel leads via which the bits of an address are transferred in parallel. This also holds for the data connections which are also shown to be double and which also consist of several leads via which the bits of each time one data word are transferred in parallel.

The data connection of the storage device 12 which may consist of a plurality of separate memories, including read-only memories, is connected to a data bus 14 whereto, in addition to further devices of a processor (not shown), the two registers 16 and 18 are connected in parallel. Write operations in these registers are controlled by control signals on the leads 8 and 9.

The outputs 17 and 19 of the registers 16 and 18, intended to store the factors to be multiplied by one another, are connected to the inputs of a multiplier device 20 which forms, within one clock period, the complete product of the two values supplied via the connections 17 and 19 and which outputs the product via the output 21. This product has double the word width, i.e. double the number of bits of the supplied factors. This is the only location within the device shown in FIG. 1 in which a double word width occurs, and the connection 21 is connected to the input of a product register 22 which is also designed for this double word width.

At the output side of the product register 22 there are connected two leads 23 and 29, the lead 23 carrying the most-significant bits whereas the lead 29 carries the least-significant bits, i.e. each lead has the single word width. The connections 23 and 29 lead to a multiplexer 24 which connects, under the control of a control signal on the lead 8, either the connection 23 or the connection 29 to an input 25 of an adder device 26. The other input 35 of the adder device 26 is connected to the output of the second multipliexer 34.

The sum output 27 of the adder 26 is connected in parallel to the inputs of two partial sum registers 30 and 32 which are alternately activated for writing via the control leads 8 and 9. The second partial sum register 32 is also provided with a carry memory 28 in which, in parallel with the second sum register, the carry occurring at the output 27a of the adder device 26 is written via the control lead 8.

The outputs 31 and 33 of the partial sum registers 30 and 32 lead to the two inputs of the multiplexer 34 which connects, controlled via the control lead 8, either the output 31 together with the output 37 of the carry memory 28 or the output 33 to the second input 35 of the adder device 26. Furthermore, the output 31 carries the desired sum at the end of the processing of the chain of products.

However, it is often desirable that the contents of the register 32 can also be read and applied to other elements.

The function of the device shown in FIG. 1 will now be described with reference to the time diagram of FIG. 2 in which the numbers preceding the individual lines denote the signals or values on the connections or the contents of the blocks denoted by the relevant references. The device shown inn FIG. 1 serves to determine scalar products, i.e. expressions of the form $$S = \sum_{i=1}^{N} A_i \cdot B_i$$

The individual values $A_i$ and $B_i$ are present in stored form, because they are required at defined instants. The intermediate sums, arising after the summing of each new product $P_i = A_i \cdot B_i$, are always temporarily stored, the preceding intermediate sum being erased thereby. The intermediate sum formed after the last product at the same time constitutes the final result.

In the time diagram of FIG. 2 it is initially assumed that the first products have already been processed and that the corresponding intermediate sum has been formed. Thus, the instant $t_0$ at the end of a second clock period T2 represents an arbitrarily selected instant during the processing of the chain of products. At this instant $t_0$ one factor $A_i$ of the current product $P_i$ to be formed, read from the storage device 12 during this clock period T2, is written into the register 16, i.e. by the ascending signal on the line 8 for the first clock period T1. At the same time the previous product $P_{i-1}$, formed in the multiplier device 20, is written into the product register 22. The partial sum registers 30 and 32 will be considered in detail hereinafter.

During the clock period T1, subsequent to the instant $t_0$, the second value $B_i$ of the product to be formed is read from the storage device 12 and applied to the input of the register 18 via the data bus 14. The signal on the control lead 9, being low during this clock period, controls the multiplexer 24 so that the connection 29, carrying the least-significant bits of the product $P_{i-1}$, is coupled to the input 25 of the adder device 26, and at the same time the output 33 of the partial sum register 32 is coupled to the input 35 of the adder device 26, via the multiplexer 34 which is controlled in the same way. The adder device 26 forms the partial sum $S^L_{i-1}$ during the clock period T1 and outputs it via the output 27 near the end of the clock period T1.

At the end of the clock period T1, i.e. at the instant $t_1$ when the signal on the control lead 8 becomes low and that on the control lead 9 becomes high, the least-significant half of the partial sum thus formed is written into the second sum register 32 and at the same time the carry signal output via the output 27a is written into the carry memory 28. Moreover, the second factor $B_i$ of the product to be formed is written into the register 18. Furthermore, the two multiplexers 24 and 34 are switched over so that now the input 25 of the adder device 26 receives the most-significant bits of the product $P_{i-1}$ at the output 23 of the product register 22 whose contents have remained the same, and at the same time the input 35 of the adder device 26 receives the more-significant bits, stored in the first partial sum register 30, of the preceding partial sum as well as the carry, output via the output 37, from the carry memory 28, so that the most-significant part of the new intermediate sum is now formed in the adder device 26 and output via the output 27; at the same time the multiplier device 20 forms the next product $P_i$, because both values $A_i$ and $B_i$ are present in the registers 16 and 18. Moreover, the control device 10 addresses the first value $A_{i+x}$ for the next product $P_{i+x}$ and applies this value, via the bus 14, inter alia to the register 16.

At the end of the clock period T2, i.e. at the instant $t_2$, the control signal on the lead 8 becomes high, so that the value $A_{i+1}$ is written into the register 16, and at the same time the product $P_i$ output by the multiplier 20 via the output 21 is written into the product register 22; furthermore, the most-significant part of the previous intermediate sum $S^H_{i-1}$ is written into the first partial sum register 30. The processing of the product $P_{i-1}$ has thus been completed, and the product $P_i$ then stored in the product register 22 can be further processed.

This takes place during the second clock period T1 shown, during which the multiplexer 24 is switched over again applies and the least-significant bits of the product $P_i$ at the output 29 of the product register 22 to the input 25 of the adder device 26. At the same time the other input 35 of the adder device 26 receives the preceding partial sum $S^L_{i-1}$, via the multiplexer 34, from the output 33 of the second partial sum register 32, and the new least-significant partial sum $S^L_i$ is formed at the output 27 of the adder device 26 and written into the second partial sum register 32 at the end of the clock period T1, i.e. at the instant $t_3$. At the same time the second value $B_{i+1}$, read during the clock period T1, is written into the register 18.

During the third clock period T2 shown, the next valid product $P_{i+1}$ is formed at the output 21 of the multiplier 20, and at the same time the most-significant bits from the product register 22 are applied to the input 25 of the adder device 26, the input 35 receiving the most-significant preceding partial sum $S^H_{i-1}$ from the first partial sum register 30 as well as the carry signal from the carry memory 28, so that the new most-significant partial sum $S^H_i$ is formed at the output 27 of the adder device 26. This partial sum is written into the first partial sum register 30 again at the end of the third clock period T2, shown.

This process is cyclically continued until all products of the chain have been calculated and processed by accumulation in the partial sum registers. As is shown in FIG. 2, processing takes place according to the pipeline principle, i.e. during the formation of one product at the same time the preceding partial sum is formed and the values of the next product are supplied. At the start, i.e. upon formation of the first product $P_1$, therefore, some preliminary processing steps are required.

These steps can be seen from FIG. 2 when i=1 is assumed. This means that prior to the instant $t_0$ first one value A must be read and written into the register at the instant $t_0$. Subsequently, the second value $B_1$ is read and written into the register 18 at the instant $t_1$. Subsequently, the first product $P_1$ can be formed so as to be written into the product register 22 at the instant $t_2$. The product $P_1$ can then be processed in the described manner; evidently, the partial sum registers 30 and 32 must have been erased during these preceding processing steps, i.e. they must contain the value zero.

The sum of a chain of products is thus formed while maintaining complete accuracy, without rounding errors, and requiring only an adder for the single word width.

We claim:

1. A method of forming the sum of a chain of products of each time two numbers which are successively supplied, each intermediate result of the summing operation being temporarily stored, characterized in that the product produced by each separate multiplication is added to the intermediate result in two steps, in that during the first step only the least-significant positions of the product are added by an adder to the corresponding positions of the intermediate result, the first partial sum and carry thus formed being temporarily stored in a first partial sum register, and a carry register, and during the second step the remaining, more-significant positions of the product are added by said adder to the corresponding remaining positions of the intermediate sum and carry of the first partial sum, the second partial sum thus formed being temporarily stored in a second partial sum register, during each step there being supplied another one of the numbers to be directly subsequently multiplied.

2. A device for forming the sum of a chain of products of each time a first and a second value, comprising a storage device for storing a number of values with a predetermined number of bits, a clock-controlled device for controlling the writing of values in registers, a first register device for storing each time two values to be multiplied by one another, a multiplier device comprising two inputs which are connected to the first register device, and a downstream product register which comprises an output for double the first number of bits, an adder device which comprises two sum inputs for each time the first number of bits, one of said inputs being connectable to the output of the product register, and a downstream sum register which consists of at least first and second partial sum registers for each time the first number of bits, comprising an output selectively coupled to the other input of the adder device, characterized in that the storage device (12) is connected to the first register device (16, 18) via only one data bus (14) for the first number of bits and that the control device (10) operates alternatively in a first and a second clock period and to apply, during the first clock period, the first number of least-significant bits at the output of the product register (22) and the contents of the first partial sum register (32) to the inputs of the adder device (26), and to write, at the end of this clock period, one of the first values ($B_i$) into the register device (16) and the first partial sum appearing at the output of the adder device (26) into the first partial sum register (32), and a carry into a temporary carry storage register, and to apply, during the second clock period, the first number of most-significant bits at the output of the product register (22) and the contents of the second partial sum register and the temporarily stored carry to the adder device (26) and to write, at the end of this clock period, one of the second values ($A_{i+1}$) into the register device (16, 18) and the second partial sum, appearing at the output of the adder device (26), into the second partial sum register and to write the product formed by the multiplier device (20) into the product register (22).

3. A device as claimed in claim 2, further comprising a first multiplexer (24) connected between the output of the product register (22) and one sum input of the adder device (26), a second multiplexer (34) connected between the outputs of the partial sum registers (30, 32) and the other input of the adder device (26), the control device (10) switching the multiplexers after each clock period.

4. A method of forming the sum of a chain of products of a plurality of sets of numbers each having a predetermined data width, which are successively supplied, each intermediate result of the summing operation being temporarily stored, comprising the steps of:

(a) sequentially receiving the plurality of numbers through a common pathway;

(b) forming a product of the numbers;

(c) sequentially summing each portion of the product with each corresponding portion of an accumulated value, with carry from any preceding partial summing operation, in order of portions from least to most significance, and updating the corresponding portion of the accumulated value as the computed sum of the portion and corresponding portion, with carry to any succeeding partial summing operation, the portion and corresponding portion having the predetermined data width.

5. The method according to claim 4, further comprising the step of providing clock cycles, a new one of said plurality of numbers being received and a new partial sum being computed on each successive clock cycle.

6. The method according to claim 4, wherein said plurality of numbers are successively supplied through a data bus.

7. The method according to claim 4, wherein two numbers are received, and the product is divided into two portions for two partial summing operations.

8. The method according to claim 4, wherein the numbers are stored prior to said product forming step.

9. The method according to claim 4, further comprising the step of storing the product of the received numbers in a register.

10. The method according to claim 4, wherein each set includes two numbers, wherein the product is summed with the accumulated value in two steps, a first step in which a least-significant portion of the product is added to the corresponding portion of the accumulated value, and a second step in which a most-significant portion of the product is added to the corresponding portion of the accumulated value, during each step there being supplied another one of the numbers to be subsequently multiplied.

11. A device for forming the sum of a chain of products of a plurality of values, sequentially receiving sets of values to be multiplied, comprising:

(a) a data bus having a predetermined data width;

(b) a plurality of registers for storing a number of values received from said data bus, each having a predetermined data width;

(c) a multiplier receiving the values from the plurality of registers and computing a product;

(d) a product register for storing the product, having a data width in excess of the predetermined data width;

(e) an accumulator, having selectively addressable portions for storing data;

(f) a carry register;

(f) an adder having two sum inputs, a sum output, a carry input and a carry output, a first input receiving a selected portion of stored data in said accumulator, a second input receiving a corresponding portion of said stored product from the product register, said carry input receiving data stored in said carry register, said sum output having a data width smaller than said product register, and said sum output outputting a sum of said first and second inputs; and (g) means for controlling in sequence the storing of sequential sets of values in said plurality of registers; selectively addressing portions of said accumulator; selectively addressing corresponding portions of said stored product; replacing said selected portion of stored data in said accumulator with said sum output; and selectively supplying said data in said carry register to said carry input.

12. The device according to claim 11, further comprising:

(a) a first multiplexer connected between said accumulator and said first input of said adder, selectively accessing said portions of said accumulator; and (b) a second multiplexer connected between said product register and said second sum input of said adder, selectively accessing corresponding portions of said product register, said controlling means controlling said first and second multiplexers to select said portions of said accumulator and said corresponding portions of said product register, in sequential order of least significance to most significance, and supplying said data in said carry register to said carry input, except for in conjunction with portions of least significance.

13. The device according to claim 11, wherein the number of values is two, and said controlling means comprises a clock operating alternatively in first and second clock periods, being for:

(a) during said first clock period:

(i) selecting a first portion of said accumulator including the least-significant bits and said corresponding portion of said stored product for input to said adder;

(ii) storing, at the end of said first clock period, the first value into a first register, respectively; and (iii) storing said carry output and partial sum from said sum output, into said carry register and said first portion of said accumulator; and (b) during said second clock period:

(i) selecting a second portion of said accumulator including the most-significant bits, said data stored in said carry register, and said corresponding portion of said stored product for input to said adder;

(ii) storing, at the end of said second clock period, the second value into a second register;

(iii) storing a partial sum from said sum output into said second portion of said accumulator; and (iv) storing said product in said product register.

14. The device according to claim 13, further comprising:

(a) a first multiplexer connected between said accumulator and said first input of said adder, selectively accessing said first portion and said second portion of said accumulator; and (b) a second multiplexer connected between said product register and said second sum input of said adder, selectively accessing said first corresponding portion and said second corresponding portion of said product register, said controlling means switching said first and second multiplexers to select said first portion and said first corresponding portion or said second portion and said second corresponding portion, respectively, after each clock period.

* * * * *